(12) United States Patent
Lee et al.

(10) Patent No.: US 8,062,730 B2
(45) Date of Patent: Nov. 22, 2011

(54) LIGHT DIFFUSION FILM WITH UNIFORM SURFACE ROUGHNESS AND LOW RETARDATION VALUE, DISPLAY INCLUDING THE SAME, AND ASSOCIATED METHODS

(75) Inventors: Jin Woo Lee, Uiwang-si (KR); Chang Gyu Im, Uiwang-si (KR); Bang Duk Kim, Uiwang-si (KR); Sun Hong Park, Uiwang-si (KR); Sei Jin Oh, Uiwang-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 498 days.

(21) Appl. No.: 12/314,138

(22) Filed: Dec. 4, 2008

(65) Prior Publication Data

US 2009/0147499 A1    Jun. 11, 2009

(30) Foreign Application Priority Data

Dec. 5, 2007    (KR) .................. 10-2007-0125527

(51) Int. Cl.
*G02B 5/02* (2006.01)

(52) U.S. Cl. ......... 428/141; 248/220; 362/355; 359/599

(58) Field of Classification Search .................. 362/355; 248/141, 220; 359/599
See application file for complete search history.

(56) References Cited

U.S. PATENT DOCUMENTS

| 5,886,819 | A | 3/1999 | Murata et al. | |
|---|---|---|---|---|
| 6,913,365 | B2 | 7/2005 | Masaki et al. | |
| 7,548,372 | B2 | 6/2009 | Ueda et al. | |
| 2007/0201131 | A1 | 8/2007 | Katsura | |
| 2007/0274092 | A9* | 11/2007 | Hay et al. | 362/555 |
| 2010/0149648 | A1* | 6/2010 | Cho et al. | 359/625 |
| 2010/0151204 | A1* | 6/2010 | Lee et al. | 428/156 |
| 2011/0116014 | A1* | 5/2011 | Lee et al. | 349/64 |
| 2011/0164321 | A1* | 7/2011 | Lee et al. | 359/599 |

FOREIGN PATENT DOCUMENTS

| EP | 1 760 498 A1 | 3/2007 |
|---|---|---|
| KR | 10-2007-0044403 A | 4/2007 |
| WO | WO 2006/057243 A1 | 6/2006 |

\* cited by examiner

*Primary Examiner* — Mark Consilvio
(74) *Attorney, Agent, or Firm* — Lee & Morse, P.C.

(57) ABSTRACT

A light diffusion film includes a thermoplastic resin, a surface of the light diffusion film has a roughness (Ra) of about 0.5 to about 3 μm and a height distribution index (HDI) of about 3 to about 8 μm, and the light diffusion film has a retardation of not more than about 25 nm.

9 Claims, 3 Drawing Sheets

[Fig. 1]
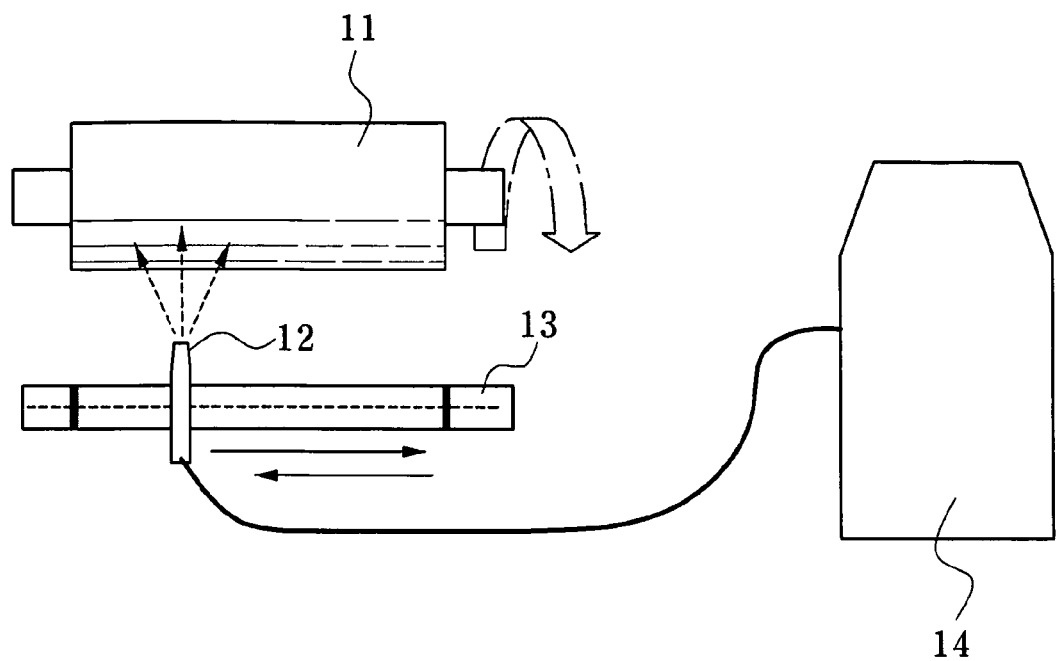
[Fig. 2]
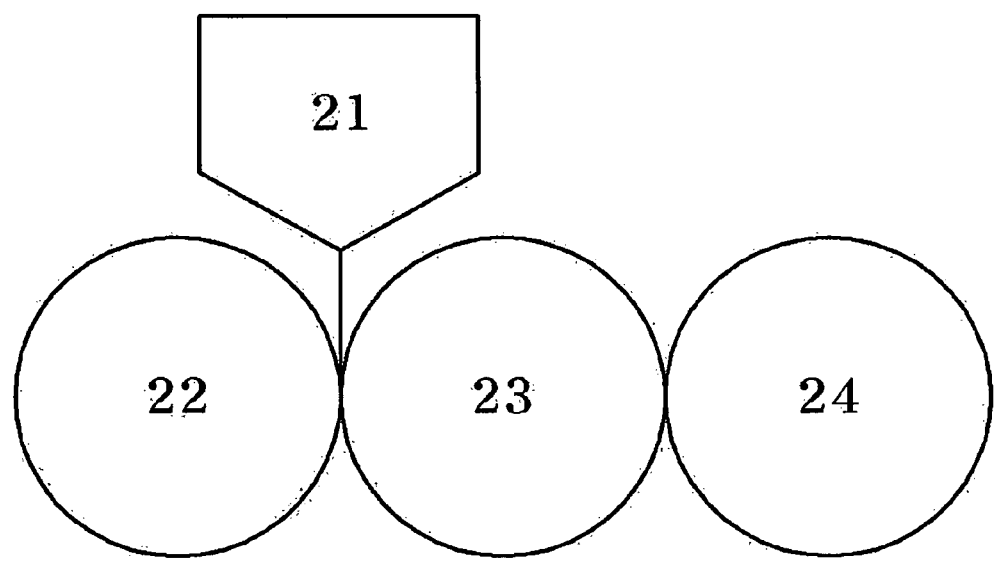

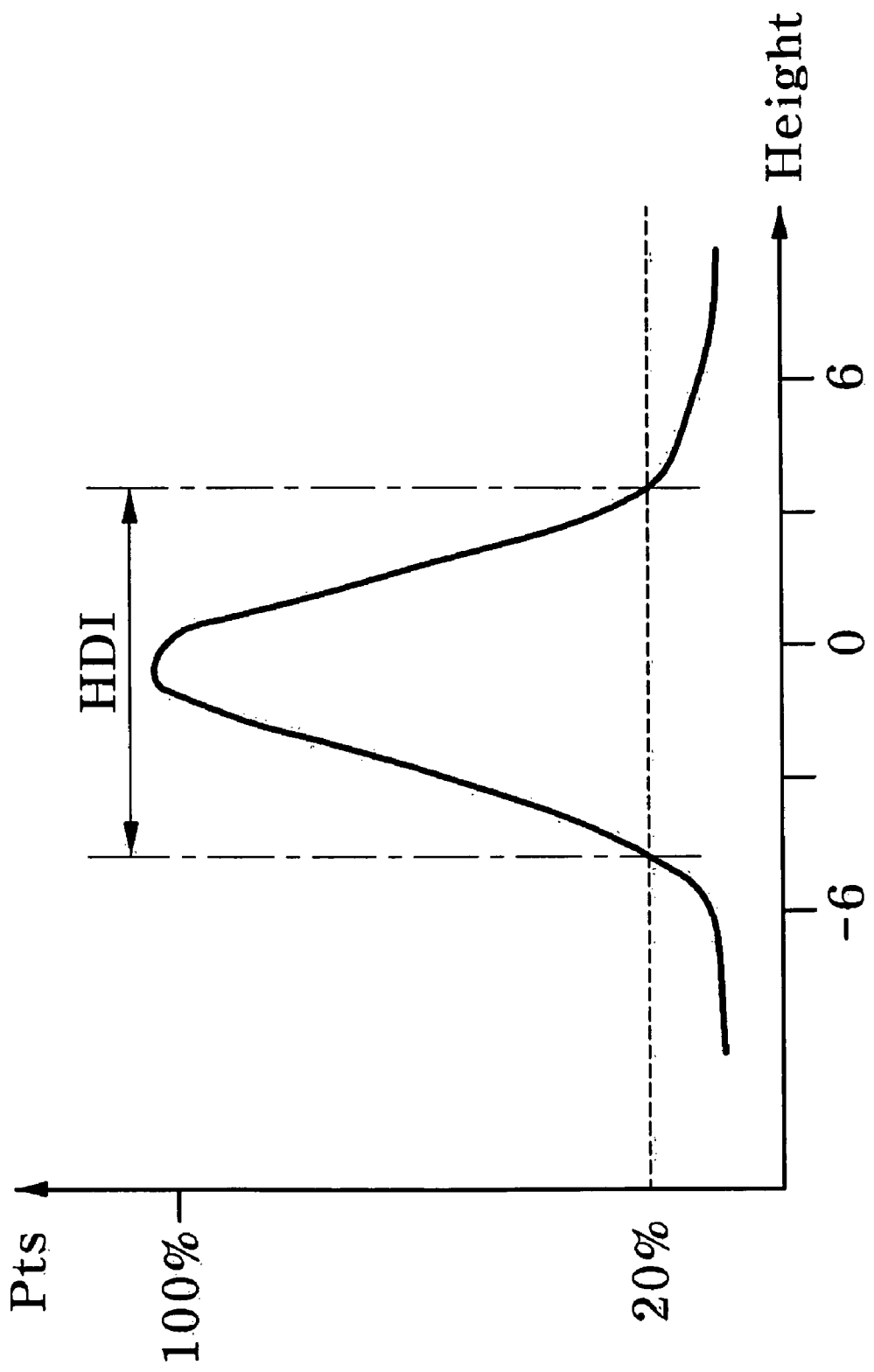
[Fig. 3]

[Fig. 4]

Table 1: Sandblasting and extrusion conditions and physical properties of light diffusion films.

| | Type of abrasive | Diameter of abrasive | Treatment frequency | Pressure between first and second cooling rolls | Temperature of second cooling roll | Ra | HDI | Haze | Transmission | Retardation | Brightness |
|---|---|---|---|---|---|---|---|---|---|---|---|
| Ex. 1 | Aluminium oxide | 106 μm | 8 times | 20 bar | 110 °C | 0.8 μm | 8 μm | 81 % | 91 % | 9 nm | 6310 cd/m² |
| Ex. 2 | Aluminium oxide | 120 μm | 8 times | 20 bar | 110 °C | 1.2 μm | 7 μm | 81 % | 91 % | 8 nm | 6390 cd/m² |
| Ex. 3 | Aluminium oxide | 120 μm | 8 times | 10 bar | 110 °C | 1.1 μm | 8 μm | 80 % | 92 % | 8 nm | 6340 cd/m² |
| Ex. 4 | Aluminium oxide | 160 μm | 8 times | 20 bar | 110 °C | 1.8 μm | 5 μm | 84 % | 93 % | 10 nm | 6380 cd/m² |
| Comp Ex. 1 | Aluminium oxide | 60 μm | 8 times | 20 bar | 110 °C | 0.4 μm | 2 μm | 58 % | 85 % | 9 nm | 6150 cd/m² |
| Comp Ex. 2 | Aluminium oxide | 220 μm | 8 times | 20 bar | 110 °C | 4.3 μm | 21 μm | 64 % | 83 % | 8 nm | 6320 cd/m² |
| Comp Ex. 3 | Aluminium oxide | 106 μm | 2 times | 20 bar | 110 °C | 3.3 μm | 15 μm | 68 % | 84 % | 8 nm | 6370 cd/m² |
| Comp Ex. 4 | Aluminium oxide | 106 μm | 15 times | 20 bar | 110 °C | 0.3 μm | 2 μm | 63 % | 85 % | 10 nm | 6230 cd/m² |
| Comp Ex. 5 | Aluminium oxide | 120 μm | 8 times | 3 bar | 110 °C | 0.4 μm | 6 μm | 55 % | 86 % | 7 nm | 6190 cd/m² |
| Comp Ex. 6 | Aluminium oxide | 120 μm | 8 times | 40 bar | 110 °C | 1.0 μm | 7 μm | 80 % | 91 % | 32 nm | 5970 cd/m² |
| Comp Ex. 7 | Aluminium oxide | 120 μm | 8 times | 20 bar | 50 °C | 0.3 μm | 6 μm | 56 % | 84 % | 29 nm | 5990 cd/m² |
| Comp Ex. 8 | Aluminium oxide | 120 μm | 8 times | 20 bar | 170 °C | 0.4 μm | 8 μm | 59 % | 85 % | 9 nm | 6050 cd/m² |

LIGHT DIFFUSION FILM WITH UNIFORM SURFACE ROUGHNESS AND LOW RETARDATION VALUE, DISPLAY INCLUDING THE SAME, AND ASSOCIATED METHODS

BACKGROUND OF THE INVENTION

1. Field of the Invention

Embodiments relate to a light diffusion film with uniform surface roughness and a low retardation value, a display including the same, and associated methods.

2. Description of the Related Art

Light diffusion films refer to a variety of products used to uniformly distribute light and maintain overall light transmission while hiding defects which may occur during light guiding. Such light diffusion films may be used in liquid crystal display devices, e.g., car navigations, mobile phones, PDAs, digital cameras, portable TVs, camcorders, small or large sized notebook PCs, monitors for desktop PCs, and the like.

At present, a great deal of research in the field of light diffusion films for liquid crystal display backlight units has focused on developing a light diffusion film capable of uniformly diffusing light without any light loss, when the light emitted from a light source passes through a diffusion layer of the film.

Conventional light diffusion films must overcome various problems. These problems may include lack of dimensional stability, coating defects caused by lack of durability in coating process, scratch defects in a coating layer, non-uniformity of surface texture, dust adhesion derived from electrostatic generation, and reduced brightness or brightness non-uniformity caused by the above defects.

In order to solve the above problems, it is desirable to impart light diffusion performance to a diffusion layer of a light diffusion film without using a diffusing agent or a coating process, and to improve the uniformity of light transmission and diffusion of the same.

In an effort to ensure uniformity of light transmission and diffusion, research has been conducted into formation of an embossing pattern on a film itself so as to effectively scatter and transmit irregular light from a light source, resulting in uniform brightness. However, due to unevenness of the formed embossing patterns, the above approach has problems achieving uniform light transmission and light diffusion. In addition, conventional light diffusion films are evaluated only by their roughness (Ra) values, thus making it difficult to uniformly control surface roughness without deviation.

Another approach to improving the brightness of liquid crystal display devices is to reduce retardation of light transmission films of backlight units. When optical distortion remains inside the light diffusion film during the production process, the retardation value of the film is increased, which is a main cause of brightness deterioration. One method of imparting a low retardation value to the film is to maintain a resin cooling roll of an extrusion device at a temperature not less than the glass transition temperature (Tg) of the resin. However, this may inhibit the surface of the film from maintaining its embossing pattern, thus causing a lower haze value. Loosely holding the film between a cooling roll and a transport roll may also be effective. This method, however, may exert only a slight reduction in retardation.

SUMMARY OF THE INVENTION

Embodiments are therefore directed to a light diffusion film, a display including the same, and associated methods, which substantially overcome one or more of the problems due to the limitations and disadvantages of the related art.

It is therefore a feature of an embodiment to provide a light diffusion film that ensures uniformity of light transmission and diffusion.

It is therefore another feature of an embodiment to provide a light diffusion film with reduced retardation, which may result in improved brightness of liquid crystal display devices.

At least one of the above and other features and advantages may be realized by providing a light diffusion film including a thermoplastic resin, wherein a surface of the light diffusion film has a roughness (Ra) of about 0.5 to about 3 μm and a height distribution index (HDI) of about 3 to about 8 μm, and the light diffusion film has a retardation of not more than about 25 nm. The light diffusion film may have a thickness of about 60 to about 450 μm.

The light diffusion film may have a haze of about 70% or greater and a total light transmission of about 80% or greater.

Preferably, the light diffusion film may have a haze of about 80% or greater and a total light transmission of about 91% or greater.

The light diffusion film may have at least one surface having an embossing pattern.

The thermoplastic resin may include at least one of a methacryl resin, a polyacetal resin, an acryl resin, a polyester resin, a vinyl resin, a polyphenylene ether resin, a polyolefin resin, an acrylonitrile-butadiene-styrene copolymer resin, a polyarylate resin, a polyethersulfone resin, a polyphenylene sulfide resin, a fluorine-based resin, a styrene resin, a cycloolefin resin, and a polycarbonate resin.

The light diffusion film may have a retardation value of about 1 to about 25 nm.

At least one of the above and other features and advantages may also be realized by providing a method for manufacturing a light diffusion film, the method including providing a second cooling roll having a sandblasted surface, the surface being sandblasted about four to about twelve times with an abrasive having a particle diameter of about 100 to about 180 μm, extruding a thermoplastic film, and molding the film on at least a first cooling roll and the second cooling roll, the second cooling roll being disposed adjacent to the first cooling roll.

The abrasive may include at least one of aluminum oxide, glass beads, plastic blast media, and ceramic beads.

The first cooling roll may include a rubber roll or a steel roll.

The method for manufacturing a light diffusion film may further include extrusion molding the film on a third cooling roll disposed adjacent to the second cooling roll.

The pressure between the first cooling roll and the second cooling roll may be about 5 to about 30 bar.

The temperature of the second cooling roll may be about 40° C. below Tg to about Tg, and Tg is the glass transition temperature of the thermoplastic film.

The nozzle diameter of the sandblasting device may be about 2 to about 9 mm, the nozzle movement speed of the sandblasting device may be about 100 to about 600 mm/min, the roll rotation speed of the sandblasting device may be about 10 to about 50 m/min, and the injection pressure of the sandblasting device may be about 0.2 to about 1 MPa.

At least one of the above and other features and advantages may also be realized by providing a display including a backlight unit and the light diffusion film according to an exemplary embodiment on the backlight unit.

At least one of the above and other features and advantages may also be realized by providing a method of manufacturing a display including providing a backlight unit and attaching the light diffusion film according to an exemplary embodiment to the backlight unit.

BRIEF DESCRIPTION OF THE DRAWINGS

The above and other features and advantages of the present invention will become more apparent to those of ordinary skill in the art by describing in detail exemplary embodiments thereof with reference to the attached drawings, in which:

FIG. 1 illustrates a schematic view of an operation principle of a sandblasting device according to an embodiment;

FIG. 2 illustrates a schematic view of an extrusion device where a component is extruded on a roll that has undergone a sandblasting process according to an embodiment;

FIG. 3 illustrates a graph showing the distribution of specimen surface height data to define an HDI of an embodiment (X-axis: height of the surface, Y-axis: the number of data points plotted at the corresponding height); and FIG. 4 illustrates Table 1, listing the sandblasting and extrusion conditions as well as the physical properties of the light diffusion films prepared according to the Examples and Comparative Examples.

DETAILED DESCRIPTION OF THE INVENTION

Korean Patent Application No. 10-2007-0125527, filed on Dec. 5, 2007, in the Korean Intellectual Property Office, and entitled: "Light Diffusion Film with Uniform Surface Roughness and Low Retardation Value and Method for Manufacturing the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a thermoplastic resin" may represent a single compound, e.g., polystyrene, or multiple compounds in combination, e.g., polystyrene mixed with polycarbonate.

An embodiment is directed to a light diffusion film that may have uniform surface roughness, i.e., a roughness (Ra) of about 0.5 to about 3 μm and a height distribution index (HDI) of about 3 to about 8 μm, and a retardation value of not more than about 25 nm.

A light diffusion film having uniform surface roughness may be produced by extruding a molten resin on a cooling roll that has undergone a sandblasting process. The light diffusion film may have superior total light transmission and haze. The uniform surface roughness may be achieved sandblasting a cooling roll a defined number of times, with an abrasive having a defined particle diameter. The thermoplastic resin light diffusion film manufactured in accordance with an embodiment may have at least one surface with an embossing pattern exhibiting superior light diffusion properties. The embossing level of the film thus may have a defined height distribution index (HDI) as well as conventional roughness (Ra).

HDI may be defined as a length of a main distribution section derived from surface height distribution obtained in surface roughness analysis of a specimen. FIG. 3 illustrates the distribution of surface height data. In FIG. 3, the X-axis represents a height of the surface and the Y-axis is the number of data points plotted at the corresponding height. Here, HDI is defined as a distribution section length of a height that corresponds to 20% of the most distributed height in a unit area, e.g., an area of 600×480 μm, which may be represented by a main distribution section of the surface height.

The light diffusion film according to an embodiment may exhibit uniform surface roughness defined by an Ra of about 0.5 to about 3 μm and an HDI of about 3 to about 8 μm, thus realizing superior optical properties.

Maintaining the Ra above about 0.5 μm and the HDI above about 3 μm may help ensure that the light diffusion film has sufficient haze. Maintaining the Ra below about 3 μm and the HDI below about 8 μm may help ensure sufficient light transmission and lower deviation in surface roughness between parts thereof. Preferably, the light diffusion film exhibits about 88% or greater total light transmission and about 70% or greater haze, more preferably about 91% or greater total light transmission and about 80% or greater haze.

In addition, the light diffusion film of an embodiment may have a retardation value of not more than about 25 nm. Maintaining the retardation value at or below about 25 nm may help ensure that light transmission does not decrease in a visible region, thus causing deterioration of the brightness of liquid crystal display devices. Preferably, the retardation value is about 1 to about 25 nm.

In order to produce a thermoplastic resin light diffusion film having a retardation value of not more than about 25 nm and a preferred haze value, it is preferable that the pressure between a first cooling roll 22 and a second cooling roll 23 of an extrusion device shown in FIG. 2 be maintained at about 5 to about 30 bar. Preferably, the first cooling roll 22 is a rubber roll.

Maintaining the pressure between the first cooling roll 22 and the second cooling roll 23 at or above about 5 bar may help ensure realization of sufficient haze due to formation of embossing patterns on the surface of the film. Maintaining the pressure between the first roll 22 and the second roll 23 at or below about 30 bar may help ensure that optical distortion does not remain in the film, thus achieving a retardation value of less than about 25 nm.

Preferably, the temperature of the second cooling roll 23 may be set at about 40° C. below Tg to about equal to Tg, wherein Tg is the glass transition temperature of the thermoplastic resin used in the film. Maintaining the temperature of the second cooling roll 23 at about 40° C. below Tg or greater may help ensure ease of transferring the roll embossing pattern onto the film surface, without unduly increasing the retardation value of the film. Maintaining the temperature of the second cooling roll 23 at about Tg or less may help ensure that the embossing pattern does not lose its shape and become deformed while the thermoplastic resin discharged from the die passes over the second cooling roll 23.

Preferably, the light diffusion film has a thickness of about 60 to about 450 μm. Maintaining the thickness of the light diffusion film at about 60 μm or greater may help ensure that curling does not occur due to excessive thinness. Maintaining the thickness at about 450 μm or less may help ensure that the thickness of a backlight unit including the light diffusion film is not undesirably increased. Furthermore, if the light diffusion film is laminated on the upper and lower surfaces of a brightness-improving lamination film, a sufficient thickness may also lead to the same advantages as above.

Preferably, the resin used for manufacturing the light diffusion film includes a thermoplastic resin. The thermoplastic resin may be any thermoplastic resin suitable for extrusion molding. The thermoplastic resin may include at least one of a methacryl resin, a styrene resin, a cycloolefin resin, and a polycarbonate resin, a polyacetal resin, an acryl resin, a polycarbonate resin, a styrene resin, a polyester resin, a vinyl resin, a polyphenylene ether resin, a polyolefin resin, an acrylonitrile-butadiene-styrene copolymer resin, a polyarylate resin, a polyethersulfone resin, a polyphenylene sulfide resin, and a fluorine-based resin.

Preferably, the thermoplastic resin includes at least one of a methacryl resin, a styrene resin, a cycloolefin resin, and a polycarbonate resin. In addition, the resin may be a copolymer or mixture thereof.

FIG. 1 illustrates a sandblasting device according to an embodiment. A cooling roll 11 may be rotated and sprayed with an abrasive through an abrasive injection nozzle 12. The abrasive injection nozzle 12 may be moved back and forth along the cooling roll 11 on a left/right moving frame 13. The abrasive may be supplied to the abrasive injection nozzle 12 from an abrasive storage tank 14.

In the sandblasting process, various factors including the type and size of abrasive, the diameter of the nozzle, nozzle movement speed, roll rotation speed, injection pressure, treatment frequency, and the like, may affect surface roughness. Of these, the most important factors may be the size of abrasive and number of treatments.

Suitable abrasives may include aluminum oxide, glass beads, plastic blast media, and ceramic beads. Preferably, the abrasive is aluminum oxide or ceramic beads.

The abrasive preferably has a particle diameter of about 100 to about 180 μm. Maintaining the particle diameter of the abrasive at about 100 μm or greater may help ensure that the Ra and HDI values of the manufactured film are sufficient. Maintaining the particle diameter of the abrasive at about 180 μm or less may help ensure that the Ra and HDI values of the manufactured film do not exceed the desired level.

Preferably, the sandblasting performed on the surface of the cooling roll 11 is performed about 4 to about 12 times in a back and forth motion. Maintaining the number of times sandblasting is performed in a back and forth motion at about 4 or more may help ensure that the Ra and HDI values do not exceed the desired level and deviation in surface roughness between parts of the film does not occur. Maintaining the number of times sandblasting is performed in a back and forth motion at about 12 or fewer may help ensure that the Ra and HDI values reach the desired range and the amount of abrasive used is decreased, lowering costs.

The remaining factors may be controlled within the desired levels. Specifically, the nozzle diameter may be about 2 to about 9 mm. The nozzle movement speed may be about 100 to about 600 mm/min. The roll rotation speed may be about 10 to about 50 m/min. The injection pressure may be about 0.2 to about 1 MPa. In some cases, the Ra and HDI values may be controlled within a limited range through variation of conditions rather than the ranges noted for these factors.

A method for manufacturing the light diffusion film according to an embodiment is preferably by extrusion molding on a cooling or polishing roll. A roll that underwent a sandblasting process in accordance with an embodiment is applied to one constituent component. FIG. 2 illustrates an extrusion device according to an embodiment, including a die 21. The molten resin may be extruded from the die 21 on a first cooling roll 22 and a second cooling roll 23, each of which may be a rubber roll or a steel roll. A third cooling roll 24 may be disposed adjacent to the second cooling roll 23. In an embodiment, the first cooling roll 22 may be a silicone rubber roll, the second cooling roll 23 may be a sandblasted steel roll, and the third cooling roll 24 may be a non-treated steel roll. Preferably, the first cooling roll 22 is a rubber roll because a phase difference of the film may be reduced and roll lifespan may be prolonged.

In accordance with an embodiment, a light diffusion film with uniform surface roughness may be manufactured by sandblasting a surface of a steel second cooling roll 23 such that the surface of the steel second cooling roll 23 has an inverse form of the embossing pattern of the film, and cooling a molten resin by interposing the resin between a steel second cooling roll 23 and a rubber first cooling roll 22. Meanwhile, a predetermined pattern, or embossing pattern, may be imparted to the rubber first cooling roll 22 by a method such as sandblasting or surface-coating.

The following Examples and Comparative Examples are provided in order to set forth particular details of one or more embodiments. However, it will be understood that the embodiments are not limited to the particular details described.

EXAMPLES

Examples 1-4

As shown in FIG. 2, the light diffusion film of an embodiment was manufactured from a polycarbonate resin by use of an extruder wherein the second cooling roll 23 was sandblasted under conditions set forth in Table 1 in FIG. 4. FIG. 1 illustrates a view of a sandblasting process performed on a second cooling roll 23 surface.

A polycarbonate resin was extruded using a PC-110 grade (Chimei) at a discharge rate of 23.4 kg/hour from a T die set at 290° C. The T die used herein had a width of 600 mm, and the first, second, and third cooling rolls used herein were a rubber first cooling roll 22, a sandblasted second cooling roll 23, and a non-treated steel third cooling roll 24, respectively. The temperatures of the first cooling roll 22, the second cooling roll 23, and the third cooling roll 24 were set such that the first cooling roll 22 temperature was 5° C. lower than the second cooling roll 23 temperature shown in Table 1, the second cooling roll 23 temperature was the same as in Table 1, and the third cooling roll 24 temperature was 5° C. higher than the second cooling roll 23 temperature. The pressure between the first cooling roll 22 and the second cooling roll 23 was set under conditions set forth in Table 1.

The roughness (Ra) and HDI of the light diffusion film thus obtained were analyzed with a Wyko profiler and the average of the values obtained by taking measurement five times was calculated. The total light transmission and haze were measured with an NDH 5000 W-Hazemeter (available from Nippon Denshoku Industries Co., Ltd), the retardation value was measured with a Kobra-21ADH (available from Oji Scientific Instruments), and the brightness was measured with an Eldim EZ-Contrast.

As a result, as shown in Table 1, the polycarbonate light diffusion films manufactured in accordance with these Examples exhibited high haze, high total light transmission, low retardation, and good brightness.

Comparative Examples 1 to 2

A light diffusion film was manufactured in the same manner as in the Examples, except that in the process of extruding the resin, a roll sandblasted by abrasives of different diameters was used as the second cooling roll 23 (see Table 1).

The polycarbonate light diffusion film thus manufactured had Ra and HDI values out of the range of the desired level and a good retardation value, but did not exhibit high haze or high total light transmission.

Comparative Examples 3 to 4

A light diffusion film was manufactured in the same manner as in the Examples, except that in the process of extruding the resin, a roll sandblasted a different number of times was used as the second cooling roll 23 (see Table 1).

The polycarbonate light diffusion film thus manufactured had Ra and HDI values out of the range of the desired level and good retardation value, but did not exhibit high haze or high total light transmission.

Comparative Example 5

A light diffusion film was manufactured in the same manner as in the Examples, except that the pressure between the first cooling roll 22 and the second cooling roll 23 was 3 bar (see Table 1).

Due to the low pressure between the first cooling roll 22 and the second cooling roll 23, Ra of the light diffusion film thus manufactured was decreased to 0.4 μm, and haze was not observed to a sufficient level.

Comparative Example 6

A light diffusion film was manufactured in the same manner as in the Examples, except that the pressure between the first cooling roll 22 and the second cooling roll 23 was 40 bar (see Table 1).

It was found that due to the high pressure between the first cooling roll 22 and the second cooling roll 23, the retardation value of the light diffusion film thus manufactured was increased to 32 nm, causing a reduction in brightness.

Comparative Example 7

A light diffusion film was manufactured in the same manner as in the Examples, except that the temperature of the second cooling roll 23 was 50° C. in the process for manufacturing the film (see Table 1). The embossing pattern was not sufficiently formed on the film surface, and the remaining stress in the film resulted in 56% haze and a retardation value of 29 nm. It is thought that this may have been caused by rapid cooling of the film surface.

Comparative Example 8

A light diffusion film was manufactured in the same manner as in the Examples, except that the temperature of the second cooling roll 23 was 170° C. in the process for manufacturing the film (see Table 1). The embossing pattern formed on the film surface lost its shape and was deformed, leading to a low Ra value of 0.4 μm. A haze of 59% was obtained.

As is apparent from the foregoing, according to embodiments, a light diffusion film with high haze and high total light transmission, as well as improved brightness, may be manufactured by imparting uniform roughness and a low retardation value to the surface of the film.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A light diffusion film, comprising:
   a thermoplastic resin, wherein:
   a surface of the light diffusion film has a roughness (Ra) of about 0.5 to about 3 μm and a height distribution index (HDI) of about 3 to about 8 μm, and
   the light diffusion film has a retardation of not more than about 25 nm.

2. The light diffusion film as claimed in claim 1, wherein the light diffusion film has a thickness of about 60 to about 450 μm.

3. The light diffusion film as claimed in claim 1, wherein the light diffusion film has a haze of about 70% or greater and a total light transmission of about 80% or greater.

4. The light diffusion film as claimed in claim 3, wherein the light diffusion film has a haze of about 80% or greater and a total light transmission of about 91% or greater.

5. The light diffusion film as claimed in claim 1, wherein the light diffusion film has at least one surface having an embossing pattern.

6. The light diffusion film as claimed in claim 1, wherein the thermoplastic resin includes at least one of a methacryl resin, a polyacetal resin, an acryl resin, a polyester resin, a vinyl resin, a polyphenylene ether resin, a polyolefin resin, an acrylonitrile-butadiene-styrene copolymer resin, a polyarylate resin, a polyethersulfone resin, a polyphenylene sulfide resin, a fluorine-based resin, a styrene resin, a cycloolefin resin, and a polycarbonate resin.

7. The light diffusion film as claimed in claim 1, wherein the light diffusion film has a retardation value of about 1 to about 25 nm.

8. A display, comprising:
   a backlight unit; and
   a light diffusion film as claimed in claim 1 on the backlight unit.

9. A method of manufacturing a display, comprising:
   providing a backlight unit; and
   attaching a light diffusion film as claimed in claim 1 to the backlight unit.

* * * * *